July 15, 1952 S. KAUFMAN 2,603,391
METHOD FOR MAKING SHOULDER PADS AND ANALOGOUS MANUFACTURES
Filed Oct. 16, 1946 3 Sheets-Sheet 3

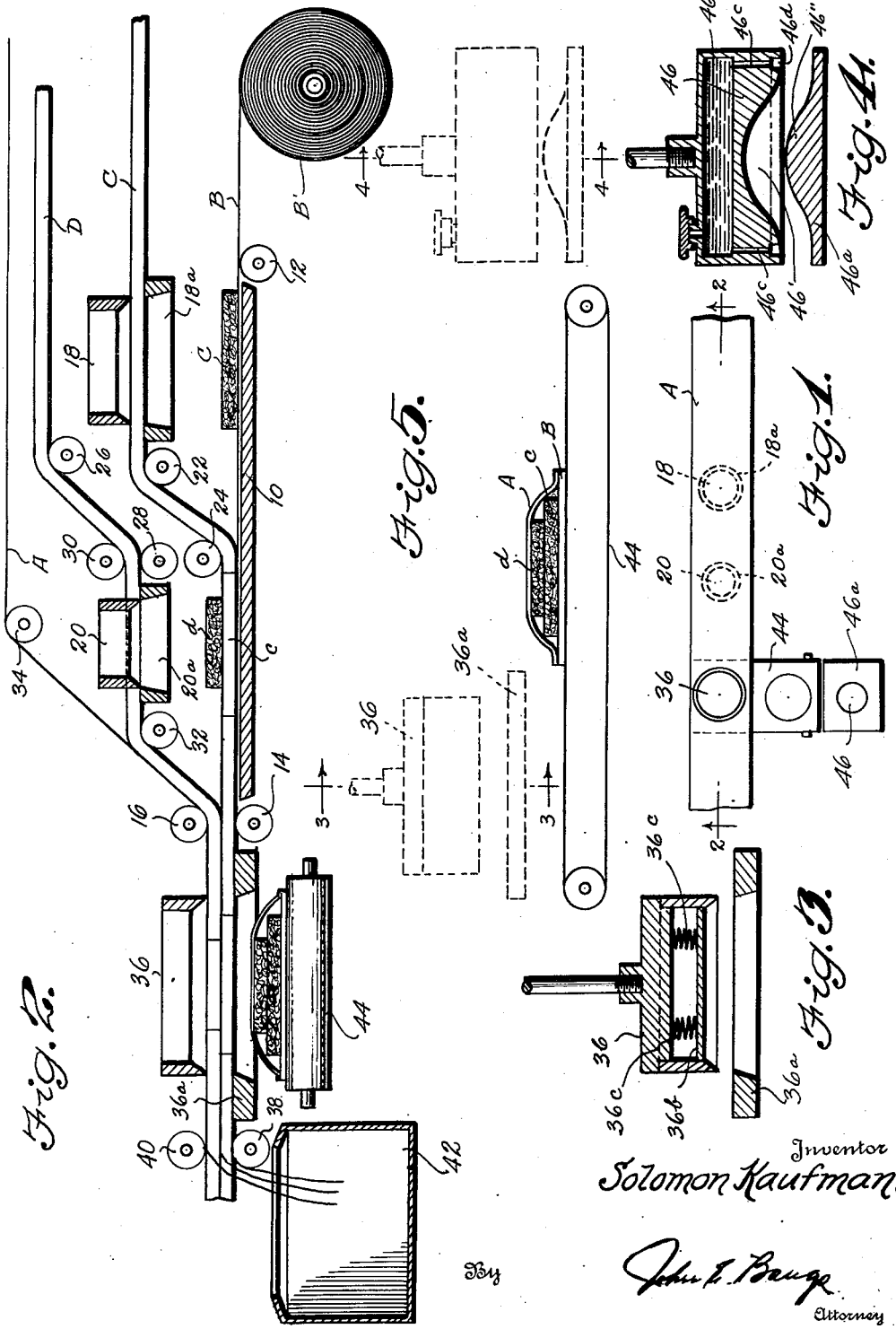

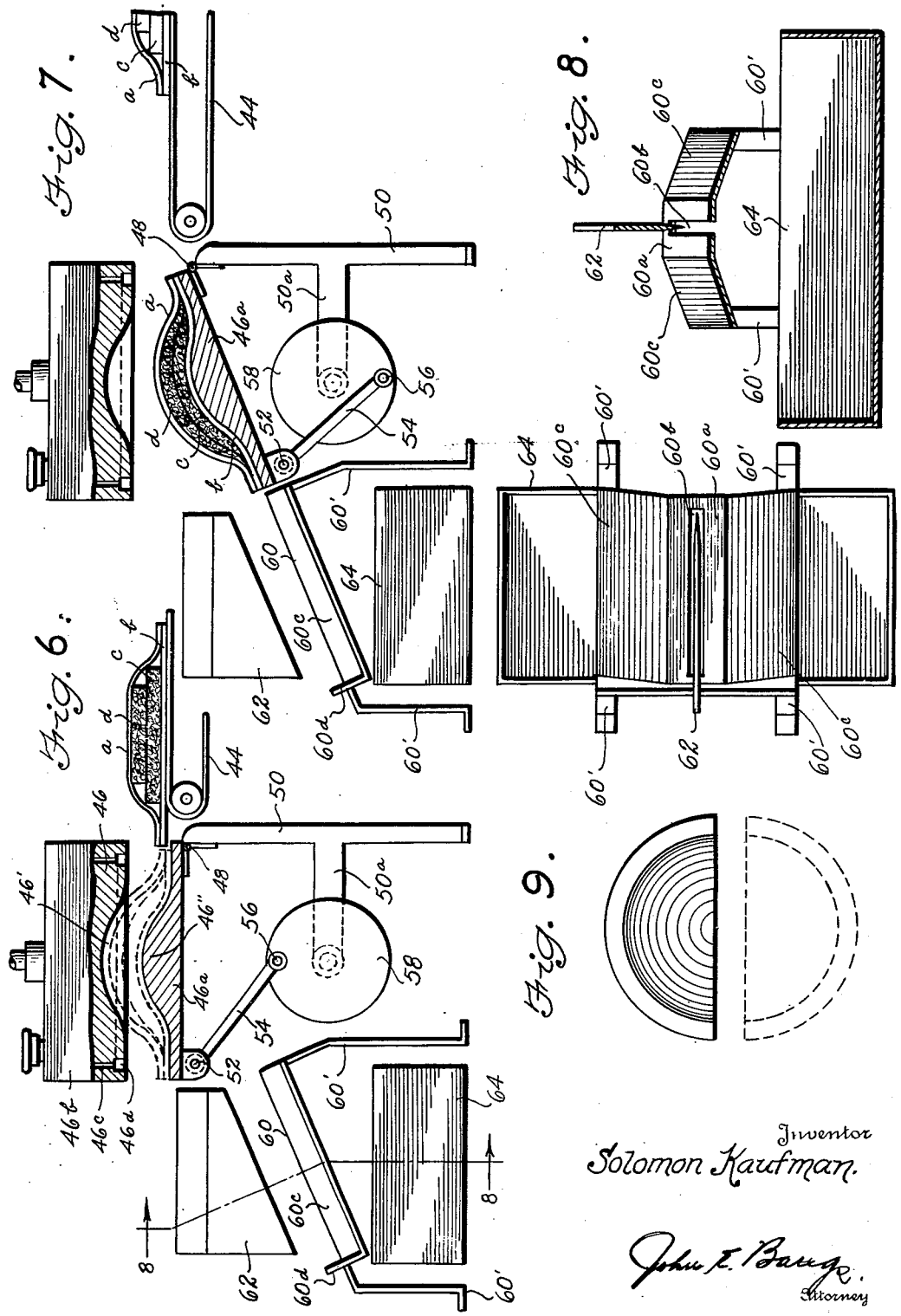

INVENTOR.
SOLOMON KAUFMAN,
BY
John E. Briggs
ATTORNEY.

Patented July 15, 1952

2,603,391

UNITED STATES PATENT OFFICE 2,603,391

METHOD FOR MAKING SHOULDER PADS AND ANALOGOUS MANUFACTURES

Solomon Kaufman, New York, N. Y.; Bessie Kaufman administratrix of said Solomon Kaufman, deceased Application October 16, 1946, Serial No. 703,563

5 Claims. (Cl. 223—57)

This invention appertains to an improved method for making shoulder pads and other similar laminated and padded articles, which are more or less similar to those produced by the methods and means forming the subject matter of my copending applications for Letters Patent of the United States, filed on March 23, 1945, serially numbered 584,389, now abandoned, and July 26, 1946, serially numbered 686,372; the padded articles produced by the instant method differing somewhat, however, in that they are preferably made thicker toward their centers, by interposing at least two layers, or pieces, of a filler or wadding material between a facing sheet and a backing sheet, and to a greater arched and gradually tapering formation, by the use of certain concavo-convex shaping means, so that, in the case of shoulder pads, a greater uniformity in fit is obtained which will more effectively conform to the contours of the human shoulders, when the pads are incorporated in body garments.

An object of the invention is to provide a method for making shoulder pads as above specified, wherein pad pair units are first formed, with the parts thereof cut to selected shape and size from sheet materials by die mechanisms, operating intermittently in a timed sequence, and automatically assembled, following which, the assembled parts of each pad pair unit are subjected to compression and the edges of the facing and backing parts simultaneously cemented together, and, thereafter, the completed pad pair unit is cut in half to form a uniformly matching pair of finished shoulder pads.

Another object of the invention has to do with the provision of the padded articles, e. g., shoulder pads, by means of a continuously operating mechanism, involving rotating elements, which function to perform substantially the same steps and to produce the same results, as in the first instance, except that a greater number of pad pair units and pairs of pads can be made in each run of the continuously operating mechanism, which permits the use of sheet materials of a greater width.

A further object of the invention lies in the use of a sheet of one of the theremoplastics in substitution for either the aforesaid facing or backing sheets, or both, so that, upon the application of heat to the overlapping edges of the cut parts of these sheets, forming a pad, or pair forming unit, the same will be securely cemented together by the softening up of the plastic, thus eliminating the need for the use of an adhesive and the means otherwise necessary for its application; additionally, the plastic, when cooled to normal state, will tend to fix and maintain the shape of the finished pads, even when washed.

Still another object of the invention lies in the use of an adhesive, or a suitable plastic, for sizing or coating the facing or backing material, or for impregnating the wadding or filler material, so that, upon the application of heat and the use of certain concavo-convex shaping and cutting means, the shoulder pads will be uniformly molded to any required form and will more effectively conform to the contours of the human shoulders, when incorporated in body garments.

With these and other objects and advantages of equal importance in view, the invention resides in the certain new and useful methods, and combinations, constructions, and arrangements of parts, as will be hereinafter more fully described, set forth in the appended claims, and illustrated in the accompanying drawings, wherein:

Figure 1 is a top plan view, illustrative of a part of one form of the apparatus, in accordance with my invention;

Figure 2 is a longitudinal, vertical section, taken through the line 2—2 on Figure 1, looking in the direction of the arrows;

Figure 3 is a transverse, vertical section, taken through the line 3—3 on Figure 5, looking in the direction of the arrows;

Figure 4 is a transverse, vertical section, taken through the line 4—4 on Figure 5, looking in the direction of the arrows;

Figure 5 is a phantom end elevation of a part of the apparatus, showing the conveyor for transferring an assembled pad pair unit from the facing and backing sheet cutting die to the compression and adhesive applying die, a pad pair unit positioned on the conveyor being in vertical cross-section;

Figure 6 is a fragmentary side elevation, showing the means for effecting the delivery of a completed pad pair unit from the compression and adhesive applying die to the cutting device for halving the unit to form a finished pair of shoulder pads, the die being partly in cross-section and its matrix at the unit compression and adhesive applying position;

Figure 7 is a view similar to Figure 6, but showing the matrix of the compression and adhesive applying die at its position to discharge the completed pad pair unit onto the cutting table for the serving of the same as before stated;

Figure 8 is a transverse, vertical section, taken through the line 8—8 on Figure 6, looking in the direction of the arrows;

Figure 9 is a top plan view of one form of a pad pair unit, after it has been halved to form a pair of identical shoulder pads;

Figure 10:
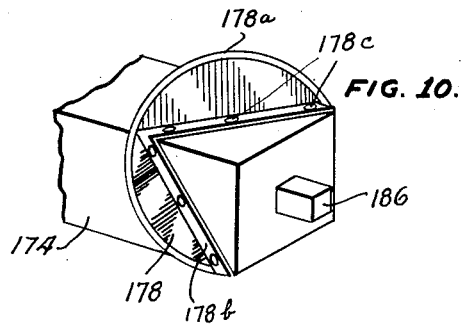
Figures 10 and 10a are fragmentary perspective views of interchangeable cutting members for use in the forming of pad pair units by the continuously operating mechanism, constituting a modified type of the apparatus, in accordance with the invention.

Considering generally the methods to be performed in conjunction with the two forms of apparatus, as exemplified in the several figures of the drawings, the same consists in the formation of a series of individual uniformly shaped pads, or pad pair units, the latter being subsequently cut in half to form individual pads, accurately matching one another in both size and shape and thereby lending uniformity to the shoulder formations of the body garments in which they are incorporated. To such end, a length of a base or backing fabric B is fed horizontally for the deposit thereon, at spaced intervals, of at least two layers or pieces c, d, (Figure 12) of a wadding, the layers or pieces differing in size, with the layers or pieces c being the smaller and superimposed on the layers or pieces d, and both being successively cut from individual lengths of wadding C and D, respectively, fed simultaneously above and in parallel relation with respect to the base or backing fabric B. A length of a top or facing fabric A is also fed simultaneously with the other of the materials, but in angular relation with respect thereto, to a point beyond the point of deposit of the first of the superimposed layers or pieces of wadding c, d, and thereafter in parallel relation with respect to the base or backing fabric B and in immediate overlying relation with respect to the uppermost of the layers or pieces of the wadding. Following this, the assembly of materials is first subjected to compression and then the facing and backing sheets A, B, are simultaneously cut to the required shape of a pad, or pad pair forming unit, the cut areas of which being sufficiently greater than that of the lowermost layers or pieces d, of the wadding, to have the edges thereof secured together, by application of a cementing substance, an adhesive, plastic, or the like, accompanied by a compression action. Only with pad pair units completed in this manner, is each of the same halved, as and for the purpose above stated.

Referring now to the drawings in detail, wherein like characters of reference denote corresponding parts in each of the related views, the apparatus, as exemplified in Figures 1 through 9, is comprised in an elongated table 10, along which the base or backing fabric B is fed from a bolt B', it passing to and from the opposite ends of the table over guide rollers 12 and 14, the roller 14 being supported beneath a compression roller 16, for the purpose to be later explained. Supported in a horizontal plane above the table 10, is a pair of cutting dies 18 and 20 and associated matrices 18a and 20a, the same differing in size, with the die 18 and its matrix 18a the larger and positioned ahead of the die 20 and its matrix 20a. Lengths of the wadding C and D are fed horizontally across the tops of the matrices 18a, 20a, respectively, simultaneously with the feed of the base or backing fabric B along the table 10; the wadding C passing from a bale or bolt (not shown) directly across the matrix 18a, beneath the die 18, then downwardly over a guide roller 22, and thence rearwardly beneath a guide roller 24, in supported relation with respect to the base or backing fabric B, while the wadding D passes from a bale or bolt (not shown) over a guide roller 26, and thence downwardly and rearwardly between a pair of guide rollers 28 and 30, before crossing the matrix 20a, of the die 20. From the matrix 20a, the wadding D passes over a guide roller 32 and thence downwardly and rearwardly beneath the compression roller 16, in supported relation with respect to the now superimposed wadding C and base or backing fabric B. The length of the top or facing fabric A extends horizontally from a bolt (not shown), above the uppermost wadding D, and then downwardly over a guide roller 34, at an angle that it meets with the wadding D at the guide roller 32 and passes therewith rearwardly beneath the compression roller 16.

In the passage of the waddings C, D, across the matrices 18a, 20a, the dies 18 and 20 operate to cut the portions c, d, therefrom, the portion c dropping through the matrix 18a and onto the base or backing fabric B, and the portion d through the matrix 20a and onto the portion c, the latter having been moved with the base or backing fabric to a position where it engages in the opening formed in the wadding C when it was cut and has the portion d deposited thereon. Likewise, the portion d is moved with the base or backing fabric and the portion c to a position where it engages in the opening formed in the wadding D when it was cut therefrom, just prior to the passage of the now laminated fabric beneath the compression roller 16.

From the point of compression beneath the roller 16, the laminated fabric passes beneath a cutting die 36 and over and across the matrix 36a associated therewith, which die and matrix is larger than the die 18 and its matrix 18a. Here, the die 36 is timed to operate sequentially with the dies 18 and 20 and the compression roller 16, to cut the top or facing and the base or backing sheets A, B, to the form of a pad pair unit which is then ejected downwardly through the matrix 36a and onto an underlying endless conveyor 44, the waste parts of the several superimposed lengths of materials passing from the matrix through feed rollers 38, 40, for deposit in a receptacle 42. The die 36 is identical in construction to that of the dies 18 and 20, except as to size, and, as shown in Figure 3, is provided with a central ejector plate 36b, sustained by coil springs 36c, to effect the discharge of each pad pair unit assembly from the matrix.

When deposited on the conveyor 44, the unit assembly is moved and transferred thereby to position beneath a compression die 46 and on a matrix 46a, associated therewith, and, as shown in Figure 4, the die is formed with an adhesive reservoir 46b, in its upper side, and with vertical ducts 46c, connecting the some with an annular channel 46d, in its lower side, the channel being adjacent the edge of the die face, in order to apply the adhesive to the edge of the top or facing portion a, of the pad pair unit, simultaneously with a compression action by the die thereon, which action results in the arching of the unit and in forcing the adhesive through the portion a and into the underlying edge of the base or backing portion b, thereby firmly uniting said edges together to complete the pad pair unit. In order to arch the pad units, during the cementing of the edges thereof, the die 46 is formed with a depression 46' in its lower face, while the matrix 46a is formed with a bulge 46'' in conformity with the depression, substantially as shown in Figure 4; it also being here pointed out that all of the several dies and the matrices associated therewith are generally made to the shape of a selected design, or pattern, of shoulder pad unit, which shape, in plan, in the present instance, being substantially circular as shown in Figure 9.

As shown in Figures 6 and 7, the matrix 46a has a side edge thereof hinged, as at 48, to a vertical support 50, and its opposite side edge pivotally connected, as at 52, to one end of a pitman 54 which has its other end pivoted, as at 56, to a rotating member or wheel 58, that has its hub journalled in an offset 50a, of the vertical support 50. Supported alongside the die 46, is a cutting table 60, which is inclined at an angle to conform to the angle of inclination of the matrix 46a, when the latter is swung downwardly through the reciprocating action of the pitman 54, due to the rotation of the member or wheel 58, the incline of both the matrix and the table being sufficient to permit the completed pad pair unit to slide from the former onto the latter. The table 60 is formed with side portions 60c, sloping downwardly from opposite sides of an intermediate flat part 60a which is longitudinally slotted, as at 60b, to receive a cutting blade 62 that is mounted for vertical reciprocating motion, in timed relation with respect to the other working parts of the apparatus, to sever the pad pair unit, along the line of its transverse center and thereby form a pair of accurately matching shoulder pads, the latter, upon being severed, sliding down the sloping portions 60c and dropping from the same into a receptacle 64. The table 60 is supported on legs 60', above the receptacle 64, and is provided with an abutment 60d at its lower end to retain the pad pair unit in place, during the cutting operation thereon by the blade 62.

Figure 12:
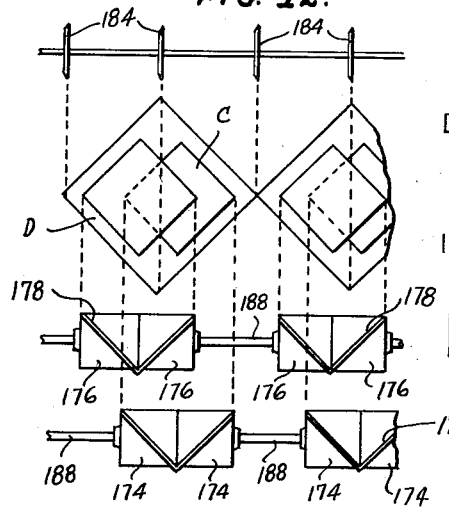
Figure 12 is a diagrammatical view, showing one method of assembly of the cut filler or wadding layers or pieces between the facing and backing sheets of two of the pad pair units.
Figure 13:
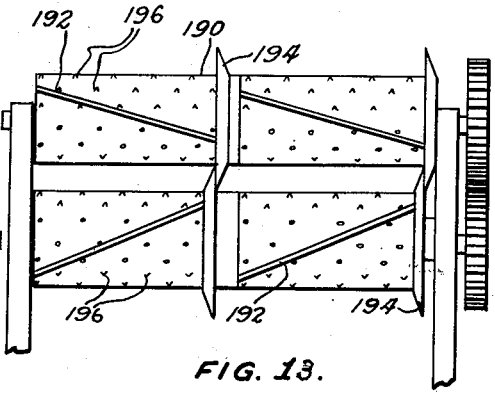
Figure 13 is side elevation view of certain of the sectional cutting rolls and the supports therefor.
Figure 14:
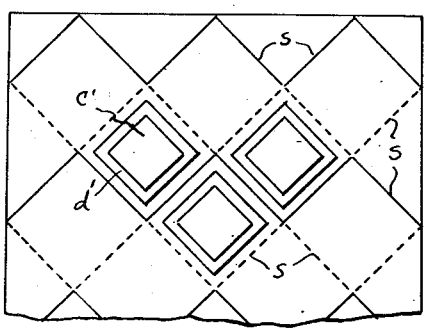
Figure 14 is a diagrammatical view, showing another method of assembly of the cut filler or wadding layers or pieces between the facing and backing sheets of several pad pair units, and, Figure 15 is a view similar to Figures 12 and 14, but showing still another manner of assembly of the cut filler or wadding layers or pieces on a backing sheet.

In the modified form of the apparatus, exemplified in Figures 10 through 14, the top or facing fabric is indicated at A', the base or backing material at B', and the wadding materials at C' and D'. Here, the base or backing material B', preferably, is in the nature of a length or sheet of one of the thermoplastics, while the dies 18 and 20, of the previously described form of the apparatus, are replaced with pairs of sectional cutting rolls 118 and 120, respectively, to which the lengths of wadding materials C', D', are fed from bolts C'' and D'', and the table 10 with a horizontally disposed endless conveyor 110, upon which the cut parts c', d', of each of the pad pair units, are deposited, the parts d' in superimposed relation with respect to the parts c', substantially as shown in Figure 12 or Figure 14. The facing and backing fabrics A', B', however, are here first passed through gates 166 and 168, respectively, which correspond to the gates 66 and 74, disclosed in my aforesaid co-pending application, Serial Number 686,372, for initially arching these fabrics, and thereafter directly to a pair of compression rolls 114, 116, that have their respective surfaces shaped after the manner of the rolls 12 and 10 (Figure 2) of said application, except that the cutting blades 56 are omitted.

As the facing and backing fabrics A' and B' pass between the rolls 114, 116, the superimposed wadding pieces c', d', are successively fed between the same at uniformly spaced intervals necessary for them to register with the cooperative depressions 62 and bulges 64, of the rolls, which function to arch these pieces in conformity with the arched formation previously imparted to the fabrics by the gates 166, 168. In order to fix the arched formation here imparted to each of the unit assemblies, the roll 114 is provided with an axial inlet 170 for the admission to its interior of a heating medium, such as steam or the like, so that the flanges 54, outlining the patterns of the pad pair units, compress the facing and backing fabrics A', B', and soften up the thermoplastic, forming the backing sheet B', to unite the same with the facing fabric A', forming seams s (Figures 11 and 14) and giving to the built-up, or laminated, structure, a waffle-like appearance, substantially as shown in Figure 14.

From the rolls 114, 116, the built-up structure passes onto an endless conveyor 172 for delivery to adjacent sets of sectional cutting rolls 174 and 176, which are similar to the cutting rolls 118, 120, but larger, in order that the cutters 178 (Figure 12) thereof sever the pad pair units one from the other, medially of each of the seams s. From the cutting rolls 176, the severed units pass onto an endless conveyor 180, assisted by a feed roller 182, positioned above the conveyor 180, to a set for circular cutters 184, which cuts the units in half, thus forming pairs of uniformly matching shoulder pads that are delivered into a receptacle 142 by an endless conveyor 140.

Figure 10A:
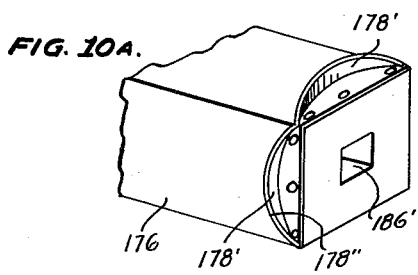
Figure 11:
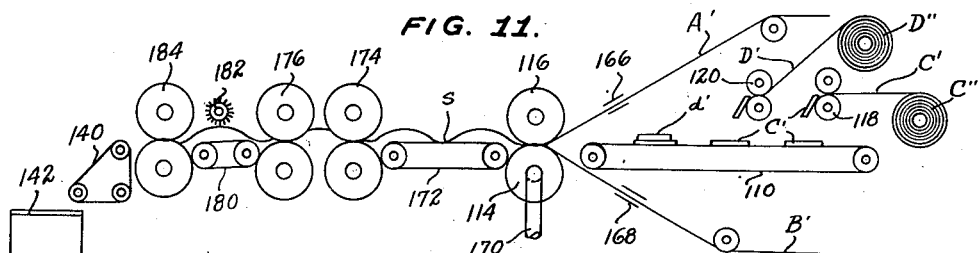
Figure 11 is a schematical side elevation view of the modified, or continuously operating, type of the apparatus.

Referring now to Figures 10, 10a, and 12, the cutting rolls 174, 176, as well as the cutting rolls 118, 120, (Figure 11), are each made up of individual sections arranged in pairs, with each section formed with a squared end upon each side face of which is mounted a cutting blade 178. As shown in Figure 10, each of the blades 178 is made straight and flat but with an arcuate cutting edge 178a and a straight base flange 178b apertured to receive fastening screws or the like 178c. The blades are arranged obliquely with respect to the axes of the roll sections, in alternately reversed relation, so that each two adjacent of the same will cut two sides of the pad pair pattern of square or diamond design. In assembly, the cutting sections are coupled together in mated pairs by means of an axially disposed lug 186 formed on the squared end of one section engaging in a socket 186' (Figure 10a) formed in the like end of the mated section, while the several pairs, corresponding in number to the number of pad pair units to be cut transversely of and from fabrics and waddings of a given width, are likewise coupled together in a suitable manner, such as the connectors 188 (Figure 12). For the formation of pad pair units of an oval or circular design, the blades 178' (Figure 10a) are each arcuate in form, with a similarly shaped cutting edge 178" and a base flange for its securement to a side face of the squared portion of a roll section. In use, each pair of these rolls are likewise coupled together by a lug 186 (Figure 10) and a socket 186' (Figure 10a) and each of the blades of one roll section reversed from those of the others, substantially as shown in Figure 12, so that, when rotated, in each revolution thereof, each pair of the blades will cut a wadding piece c', d', from the respective lengths of the C', D', as well as a piece a', b', from the respective lengths of the facing and backing materials A', B'.

Figure 15:
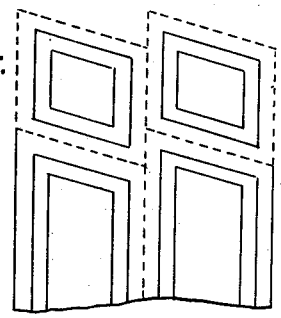

In order to make each of a pair of the shoulder pads with a greater taper toward the side edges thereof from a centrally thickened transverse end edge, the pairs of rolls 174, 176, are arranged in an offset relation, so that the wadding pieces c, d, are postioned between the facing and backing pieces a, b, in an offset but overlapping relation, substantially as shown in Figure 12, the smaller overlapping portions providing the aforesaid thickened part of each pad unit. However, with the wadding pieces c, c', centered on the wadding part d, d', as shown in Figures 14 and 15, a lesser taper and a larger thickened area is provided for in the finished pads. In Figure 13, a coupled pair of a modified form of sectional cutting roll 190 is shown for cutting out pad pair units of a diamond design, the sections being coupled together after the manner of the rolls 174, 176, and provided with diagonal cutting blades 192 and a circular cutter 194, at one end. These roll sections 190 are also provided with a series of radially projecting pins 196 to facilitate the feeding of the lengths of materials from the supply bolts thereof; it being intended that similar feed pins be provided on the endless conveyor 172 and the rolls 174 and 176.

In the use of the thermoplastic sheet, as before stated, i. e., subjecting it simultaneously to pressure and heat, a substantially molded pad, or pad pair unit, is obtained. This form of pad, or pad pair unit may, however, be produced by coating the facing and backing materials with a plastic solution as they are being fed into the shaping and cutting mechanisms. In lieu of forming pad pair units, individual pads may be produced with equal accuracy and facility, by employing forming means, i. e., pressure shaping and cutting, of proper design, in which case the cutters for severing the pad pair units in the transverse direction will be eliminated.

Having thus fully described preferred and practical embodiments of my invention and the methods of performance thereof, it is to be understood that the words which I have used are words of description rather than of limitation, and that changes within the purview of the appended claims may be made, without departing from the true scope and spirit of the invention in its broader aspects.

What I claim is:

1. The method of making shoulder pads and the like, which consists in cutting out pieces from at least two lengths of a wadding material, superimposing the cut piece of one length of the wadding material on the cut piece of the other length of the wadding material, feeding a length of a backing material horizontally beneath said lengths of the wadding material for the deposit of the superimposed pieces of the latter material at spaced intervals thereon, simultaneously feeding a length of a facing material horizontally above said lengths of the wadding and backing materials and superimposing it on the superimposed pieces of the wadding material, cutting out pieces of the backing and facing materials to a greater area than that of said cut wadding pieces and along lines in spaced parallel relation with respect to the edges of the latter to form pad pair units of a selected design, cementing the edges of the cut pieces of the backing and facing materials together, and then cutting the pad pair units in half to form uniformly matching pairs of the finished shoulder pads.

2. The method as defined in claim 1, wherein said lengths of wadding material are fed simultaneously in a horizontal direction, one above the other, for the cutting of transversely extending rows of the said pieces therefrom, the said pieces cut out from the uppermost length being superimposed on those of the lowermost length.

3. The method as defined in claim 1, wherein the said pad pair units are shaped to arch form and subjected to compression during the cementing of the edges of the backing and facing pieces thereof.

4. The method of making shoulder pads and the like, which consists in cutting out pieces from at least two lengths of a filler material, superimposing the cut pieces of one length of the filler material on the cut pieces of the other length of the filler material, feeding a length of a backing material horizontally beneath said lengths of the filler material for the deposit of the superimposed pieces of the latter material at spaced intervals thereon, simultaneously feeding a length of a facing material horizontally above said lengths of the filler material and superimposing it on the superimposed pieces of the filler material, cutting out pieces of the backing and facing materials to a greater area than that of said cut filler pieces and along lines in spaced parallel relation with respect to the edges of the latter to form pad pair forming units of a selected design.

5. The method as defined in claim 4, with the added step of cementing the edges of the cut pieces of the backing and facing materials together.

SOLOMON KAUFMAN.

REFERENCES CITED

The following references are of record in the file of this patent:

UNITED STATES PATENTS

| Number | Name | Date |
| --- | --- | --- |
| 2,170,199 | Hawkins et al. | Aug. 22, 1939 |
| 2,172,499 | Chassaing | Sept. 12, 1939 |
| 2,425,227 | Bloom | Aug. 5, 1947 |